United States Patent
Griffin et al.

(10) Patent No.: US 7,158,120 B2
(45) Date of Patent: Jan. 2, 2007

(54) HAND-HELD ELECTRONIC DEVICE

(75) Inventors: Jason T. Griffin, Waterloo (CA); John A. Holmes, Waterloo (CA); Mihal Lazaridis, Waterloo (CA); Herb A. Little, Waterloo (CA); Harry R. Major, Waterloo (CA); Craig Dunk, Guelph (CA); Michael Brown, Heidelberg (CA); Jérôme Lang, Toronto (CA)

(73) Assignee: Research In Motion Limited, Waterloo ( * ) Notice: Subject to any disclaimer, the term of this patent is extended or adjusted under 35 U.S.C. 154(b) by 637 days.

(21) Appl. No.: 10/176,866

(22) Filed: Jun. 21, 2002

(65) Prior Publication Data

US 2002/0149567 A1    Oct. 17, 2002

Related U.S. Application Data

(63) Continuation of application No. 09/543,231, filed on Apr. 5, 2000, now Pat. No. 6,489,950, which is a continuation-in-part of application No. 29/108,876, filed on Aug. 5, 1999, now Pat. No. Des. 433,460, and a continuation-in-part of application No. 09/344,432, filed on Jun. 25, 1999, now Pat. No. 6,396,482, which is a continuation-in-part of application No. 09/106,585, filed on Jun. 29, 1998, now Pat. No. 6,278,442, which is a continuation-in-part of application No. 29/089,942, filed on Jun. 26, 1998, now Pat. No. Des. 416,256.

(51) Int. Cl.
    *G09G 5/00*    (2006.01)
(52) U.S. Cl. ...................... 345/168; 345/172
(58) Field of Classification Search ............... 345/156, 345/157, 168–172
    See application file for complete search history.

(56) References Cited

U.S. PATENT DOCUMENTS

| 4,029,915 | A | 6/1977 | Ojima |
| 4,449,839 | A | 5/1984 | Bleuer |
| D278,341 | S | 4/1985 | Scheid |
| D293,241 | S | 12/1987 | Wan et al. |
| D312,628 | S | 12/1990 | Yokoi et al. |
| D313,401 | S | 1/1991 | Tanabe |
| D313,413 | S | 1/1991 | Langton |
| 5,059,048 | A | 10/1991 | Sirkin |
| 5,184,830 | A | 2/1993 | Okada et al. |
| 5,217,295 | A | 6/1993 | Tortola et al. |

(Continued)

FOREIGN PATENT DOCUMENTS

EP    0267801    5/1988

(Continued)

OTHER PUBLICATIONS

"Mastering Microsoft Office 97", Moseley et al. 1996, pp. 315-316.*

*Primary Examiner*—Dennis-Doon Chow

(57) ABSTRACT

A hand-held electronic device with a keyboard, thumbwheel, display and associated software is optimized for use of the device with the thumbs. The associated software has a plurality of features to optimize efficient use of the limited keyboard space and encourage the use of the device by thumb-based data entry through the thumbwheel and/or through a combination of minimal number of keystrokes. Software features include international character scrolling, and auto-capitalization. The keys on the device keyboard are optimally shaped and configured for thumb-based input. In addition, the thumbwheel is inclined between the front and a side edge of the device so as to be reachable by either the thumb or index finger of the user's hand at the side edge of the device.

24 Claims, 9 Drawing Sheets

U.S. PATENT DOCUMENTS

| | | |
|---|---|---|
| 5,288,158 A | 2/1994 | Matias |
| 5,336,001 A | 8/1994 | Lichtenberg |
| 5,337,346 A | 8/1994 | Uchikura |
| 5,360,280 A | 11/1994 | Camacho et al. |
| 5,367,298 A | 11/1994 | Axthelm |
| D357,253 S | 4/1995 | Wong |
| 5,410,141 A | 4/1995 | Koenck et al. |
| 5,410,333 A | 4/1995 | Conway |
| 5,426,449 A | 6/1995 | Danziger |
| D359,920 S | 7/1995 | Sakamoto |
| 5,436,954 A | 7/1995 | Nishiyama et al. |
| 5,457,454 A | 10/1995 | Sugano |
| D367,043 S | 2/1996 | Ross et al. |
| 5,500,643 A | 3/1996 | Grant |
| 5,543,787 A | 8/1996 | Karidis et al. |
| 5,563,631 A | 10/1996 | Masunaga |
| 5,575,576 A | 11/1996 | Roysden, Jr. |
| 5,600,790 A | 2/1997 | Barnstijn et al. |
| 5,606,712 A | 2/1997 | Hidaka |
| 5,611,031 A | 3/1997 | Hertzfeld et al. |
| D381,021 S | 7/1997 | Williams et al. |
| 5,659,307 A | 8/1997 | Karidis et al. |
| 5,661,605 A | 8/1997 | Conway |
| D383,756 S | 9/1997 | Henderson et al. |
| 5,672,108 A | 9/1997 | Lam et al. |
| D386,497 S | 11/1997 | Huslig et al. |
| 5,689,253 A | 11/1997 | Hargreaves et al. |
| D390,509 S | 2/1998 | Antzinas et al. |
| 5,737,394 A | 4/1998 | Anderson et al. |
| 5,786,776 A | 7/1998 | Kisaichi et al. ............... 341/23 |
| D397,369 S | 8/1998 | Rissman |
| D397,728 S | 9/1998 | Yuen et al. |
| D399,537 S | 10/1998 | Chi et al. |
| 5,818,437 A | 10/1998 | Grover et al. |
| 5,825,353 A | 10/1998 | Will |
| 5,827,082 A | 10/1998 | Laine |
| D402,572 S | 12/1998 | Han |
| D403,362 S | 12/1998 | Fai |
| 5,861,821 A | 1/1999 | Kato et al. |
| 5,893,798 A | 4/1999 | Stambolic et al. |
| 5,915,228 A | 6/1999 | Kunihiro et al. |
| 5,920,308 A | 7/1999 | Kim |
| 5,931,873 A | 8/1999 | Cisar |
| 5,963,197 A | 10/1999 | Bacon et al. |
| 5,974,238 A | 10/1999 | Chase, Jr. |
| D416,256 S | 11/1999 | Griffin et al. |
| 5,982,520 A | 11/1999 | Weiser et al. |
| 5,995,026 A | 11/1999 | Sellers |
| 6,005,496 A | 12/1999 | Hargreaves et al. |
| 6,006,351 A | 12/1999 | Peretz et al. |
| 6,009,333 A | 12/1999 | Chaco |
| 6,014,429 A | 1/2000 | LaPorta et al. |
| 6,014,573 A | 1/2000 | Lehtonen et al. |
| D420,351 S | 2/2000 | Waldner |
| 6,023,779 A | 2/2000 | Fullam et al. |
| 6,047,047 A | 4/2000 | Aldridge et al. |
| 6,047,196 A | 4/2000 | Makela et al. |
| 6,049,796 A | 4/2000 | Siitonen et al. |
| 6,052,070 A | 4/2000 | Kivela et al. |
| 6,084,576 A | 7/2000 | Leu et al. |
| 6,091,956 A | 7/2000 | Hollenberg |
| 6,094,197 A | 7/2000 | Buxton et al. |
| 6,102,594 A | 8/2000 | Strom |
| 6,103,979 A | 8/2000 | Motoyama et al. |
| 6,107,997 A | 8/2000 | Ure |
| D432,511 S | 10/2000 | Eckholm |
| D433,017 S | 10/2000 | Martinez |
| D433,460 S | 11/2000 | Griffin et al. |
| 6,148,261 A | 11/2000 | Obradovich et al. |
| 6,157,323 A | 12/2000 | Tso et al. |
| D436,591 S | 1/2001 | Abston et al. |
| 6,198,474 B1 * | 3/2001 | Roylance .................... 345/168 |
| 6,212,412 B1 | 4/2001 | Rogers et al. |
| D441,733 S | 5/2001 | Do et al. |
| 6,243,789 B1 | 6/2001 | Hasbun et al. |
| 6,278,442 B1 | 8/2001 | Griffin et al. |
| 6,295,052 B1 | 9/2001 | Kato et al. |
| 6,297,795 B1 | 10/2001 | Kato et al. |
| 6,304,261 B1 | 10/2001 | Shields et al. |
| 6,304,431 B1 | 10/2001 | Kim |
| 6,310,609 B1 | 10/2001 | Morgenthaler |
| D451,079 S | 11/2001 | Ali |
| D454,349 S | 3/2002 | Makidera et al. |
| D454,849 S | 3/2002 | Eckholm |
| 6,356,258 B1 | 3/2002 | Kato et al. |
| 6,374,277 B1 | 4/2002 | Vong et al. |
| D456,794 S | 5/2002 | Laverick et al. |
| 6,385,463 B1 | 5/2002 | Lieberman et al. |
| 6,396,482 B1 | 5/2002 | Griffin et al. |
| D458,239 S | 6/2002 | Shim et al. |
| D459,327 S | 6/2002 | Ali |
| D460,068 S | 7/2002 | Lanzaro et al. |
| D460,493 S | 7/2002 | Griffin et al. |
| D461,803 S | 8/2002 | Griffin et al. |
| 6,452,588 B1 | 9/2002 | Griffin et al. |
| D464,995 S | 10/2002 | Griffin et al. |
| 6,459,968 B1 | 10/2002 | Kochie |
| 6,489,950 B1 | 12/2002 | Griffin et al. |
| 6,507,336 B1 | 1/2003 | Lunsford |
| D472,225 S | 3/2003 | Griffin |
| 6,535,749 B1 | 3/2003 | Iwata et al. |
| 6,538,651 B1 | 3/2003 | Haymann et al. |
| D472,551 S | 4/2003 | Griffin |
| D473,226 S | 4/2003 | Griffin |
| D476,985 S | 7/2003 | Griffin |
| D478,585 S | 8/2003 | Griffin |
| 6,611,254 B1 | 8/2003 | Griffin et al. |
| D479,233 S | 9/2003 | Griffin |
| D480,722 S | 10/2003 | Griffin |
| 6,630,924 B1 | 10/2003 | Peck |
| 6,647,367 B1 | 11/2003 | McArthur et al. |
| 2001/0044828 A1 | 11/2001 | Kikinis .................... 709/206 |

FOREIGN PATENT DOCUMENTS

| | | |
|---|---|---|
| EP | 0278169 | 8/1988 |
| EP | 0538020 | 4/1993 |
| EP | 0685801 | 12/1995 |
| EP | 0732646 | 9/1996 |
| EP | 0760291 | 3/1997 |
| EP | 1143327 | 10/2001 |
| WO | 9833111 | 7/1998 |
| WO | 9937025 | 7/1999 |
| WO | 0030381 | 5/2000 |
| WO | 0038041 | 6/2000 |
| WO | 0074240 | 12/2000 |
| WO | 0150335 | 7/2001 |

* cited by examiner

HAND-HELD ELECTRONIC DEVICE

CROSS-REFERENCE TO RELATED APPLICATION

This is a continuation of U.S. patent application Ser. No. 09/543,231, entitled "Hand-Held Electronic Device With Auxiliary Input Device," filed Apr. 5, 2000 now U.S. Pat. No. 6,489,950, which is a continuation-in-part of U.S. Design Patent Application Serial No. 29/108,876, entitled "Hand-Held Electronic Device," filed Aug. 5, 1999, now U.S. Patent No. Des. 433,460, and further is a continuation-in-part of U.S. patent application Ser. No. 09/344,432, entitled "Hand-Held Electronic Device With A Keyboard Optimized For Use With The Thumbs," filed Jun. 25, 1999, now U.S. Pat. No. 6,396,482, which is a continuation-in-part of U.S. patent application Ser. No. 09/106,585, entitled "Hand-Held Electronic Device With A Keyboard Optimized For Use With The Thumbs," filed Jun. 29, 1998, now U.S. Pat. No. 6,278,442, which in turn is a continuation-in-part of U.S. Design Application Serial No. 29/089,942, entitled "Hand-Held Messaging Device With Keyboard," filed Jun. 26, 1998, now U.S. Patent No. Des. 416,256. All earlier-filed applications have been assigned to the assignee of the present application.

BACKGROUND OF THE INVENTION

The present invention is directed toward the field of small, hand-held electronic devices such as personal data assistants (PDA's), personal information managers (PIM's), two-way pagers and the like. In particular, the system and method of the present invention provide the user of the hand-held device with the ability to input data with a minimal amount of key strokes and optimized for use substantially with the thumbs.

In a two-way paging system that provides two-way, full text messaging, there is a need to permit the user to initiate messages and to respond to messages in a timely fashion and with text entirely created by the user. In order to keep the form factor of the two-way pager small enough to be worn on the body of the user, such as with a belt clip, the input device needs to be small, have a minimal number of keys and optimized for use with a minimal number of key strokes. Prior art systems have attempted to address these needs by incorporating virtual keyboards or pen-based input systems for user inputs to the device, but such systems require the user to input data in an unfamiliar manner. Additionally, in a small hand-held messaging device, such as a two-way pager, these systems prove awkward to use.

In order to provide a hand-held electronic device that permits a user the opportunity to enter data into an address book, a calendar, a task list, an email message or a similar text file that requires user-generated data, the instant invention is directed to an input device that is oriented to be used substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation and in a particular shape that attempts to maximize the surface area of the thumb hitting the key and to provide the user with a comfortable position of the hands for data input. Also, the orientation encourages input by the thumbs, which the inventors of the instant invention have discovered to be faster and more accurate in small hand-held electronic devices than touch-typing or "hunting and pecking" typing.

An additional feature of the invention is the use of an additional input means for control of functions that might otherwise be controlled by a keyboard that included function keys. To encourage data entry using thumbs and again to minimize the number of keys on the keyboard, the instant invention also includes a thumb-wheel to control menus for the selection of forms and functions relevant to data input. As discussed below, one of the data forms the thumbwheel is implemented to accommodate is a special character set. The thumb-wheel is positioned in close proximity to the keyboard to enable an easy transition from thumb-based typing to thumb control of forms and functions.

In addition to hardware features that encourage optimal data entry though the use of the thumbs, there are several software features that are designed to minimize keystrokes and aid in entry of data.

The features of this invention, both individually and collectively, have not, to the knowledge of the inventors, been applied to a small hand-held electronic device that requires user-generated data entry. To permit efficient operation of such devices while keeping the form factor of the device small enough to be worn on the body, there is a general need for a hand-held electronic device that can fit in the palm of the hand and that can be operated substantially with the thumbs.

There is a further need for a keyboard for a palm-size data entry device with keys placed at an angle to optimize operation of the keyboard by with the thumbs.

There remains another need for a keyboard with keys that are shaped arid sized to maximize contact with the thumbs while minimizing the keyboard area required for such keys.

There also remains a need for an auxiliary input device operated by the thumbs that may be used for inputting data forms and for function control, and that, in conjunction with the keyboard, encourages and permits data entry and management through input performed substantially by the thumbs.

There remains still another need for a software-implemented user interface system that is designed, at least in part, to support and encourage data entry through use of the thumbs.

There remains another need for facilitating entry of special or international characters with the thumbs while limiting the keyboard area.

There remains another need for automatically entering certain common punctuation, thereby reducing repetitive key entry and increasing the speed of data entry.

There remains another need for automatically entering certain common phrases or electronic signatures without tediously typing the full phrase or electronic signature.

There remains another need for easily removing automatic features when such features are not desired.

There remains another need for executing a set of common instructions for a particular task with a minimum amount of user data entry.

SUMMARY OF THE INVENTION

The present invention overcomes the problems noted above and satisfies the needs in this field for a hand-held electronic device with a keyboard optimized for use with the thumbs. In the preferred embodiment of the present invention, the hand-held electronic device is a two-way paging or wireless email device (such as the Inter@ctive™ pager manufactured and marketed by the assignee of the present invention) that permits full-text, two-way messaging, such as email messaging. The device may also include standard PDA or PTA features, such as an address book, an electronic calendar, a task list and other text-based features. Such features require user input of text strings that can be lengthy and that cannot be reduced to pre-determined or "canned" strings. Thus, the efficient entry of data in a device meant to fit into the palm of one's hand requires that two goals be achieved. First, the data entry must be relatively easy from a user's perspective. This means that the user must be somewhat familiar with analogous forms of data entry and does not need to be trained in order to enter data into the hand-held device. Second, the form factor does not permit a large number of keys, nor doe it permit keys that are very large. Thus, efficient use of space on the keyboard is required, and functions that can be performed by a standard keyboard are off-loaded to an auxiliary input device or are performed through a normal number of keystrokes that encourage the use of thumb-based data entry.

To accomplish these goals, the invention first optimizes the placement of the keys on the device keyboard. In order to work within the limited space available for the keyboard, it was determined that the keyboard should preferably use keys that are oval or oblong and that are placed at angles designed to facilitate thumb typing. An angle for the keys on the right side of the keyboard and a complementary angle for the keys on the left side of the keyboard are chosen based upon observation of the angle at which a user will orient his or her thumbs while thumb-typing.

The invention also minimizes the number of keys available or required for data input. In the preferred embodiment, the only available keys are the 26 letters of the English alphabet, a backspace key, a line feed key, an "alt" key, a "cap" key and a space bar. The "alt" key may be used in conjunction with the other keys to input numbers and symbols to perform certain functions. The placement of the keys is designed to enhance the user experience while typing with the thumbs by meeting two seemingly opposite goals—minimizing the keyboard footprint while maximizing the likelihood that proper keys will be struck by the thumb-typing user.

Alternative embodiments could include fewer or more keys, including, for example, function keys or control keys. The form factor, however, generally limits the number of keys that may be implemented if the goal of facilitating thumb typing is to be met.

The invention also provides additional incentive for the user to use thumb input by providing an input device adjacent to the keyboard but integral to the overall hand-held device. Although other devices can be used in an auxiliary fashion, the preferred device is a thumbwheel that registers movement of the wheel by measuring the number of indents traversed while rolling the wheel and that also registers as an input the depression or "clicking" of the wheel, which is performed by pressing the wheel toward the back of the pager. This clicking of the wheel is similar to the clicking of a mouse associated with a PC or any other input device that registers the depression of a button. The thumbwheel in the preferred embodiment is placed vertically on the two-way paging device so the user can easily move his or her thumb from the thumbwheel to the keyboard and back in order to perform functions and to retrieve data forms, such as an email template or address book entry template, for data entry.

Additionally, various software techniques can be implemented to enhance the thumb-typing user's experience in using the device of the instant invention. In the preferred embodiment, for example, the user can change the capitalization of a particular letter simply by keeping a key depressed for a particular length of time without an intermittent release being detected by the keyboard controller.

According to an aspect of the present invention there is provided a method of changing the character display of a key on a keyboard of a handheld wireless communications device comprising the steps of: receiving a first input from a depression of a keyboard key, the first input defining a first character associated with the depressed keyboard key; receiving a second input from an auxiliary input device in conjunction with the continual depression of the keyboard key; initiating of an altering character condition and processing the altering character condition; and modifying the first character and submitting for display a second character associated with the depressed keyboard key.

According to another aspect of the present invention there is provided a method of modifying the character display of a key on a keyboard comprising the steps of: receiving a first input from a depression of a keyboard key, the first input associating a first character associated with the depressed keyboard key; initiating of an altering character condition upon a continual depression of the keyboard key beyond a predefined period of time; processing the altering character condition; and, modifying the first character and submitting for display a second character.

According to another aspect of the present invention there is provided a handheld two-way wireless communications device optimally configured for use with the thumbs of a user comprising, a keyboard; an auxiliary input device positioned in relative proximity to the keyboard and control logic circuitry associated with the auxiliary input device; a display positioned adjacent to the keyboard; a microprocessor to control the operation of the device; and a software application residing in the communications device for providing a plurality of thumb-based operational features, the software application initiating certain operational features upon certain inputs from the keyboard or the auxiliary input device.

According to another aspect of the present invention there is provided a hand-held two-way wireless communications device optimally configured for use with the thumbs of a user comprising: a keyboard having a first set of keys and a second set of keys, wherein the first set of keys is positioned a positive predetermined degree relative to a vertical reference and the second set of keys is positioned a negative predetermined degree relative to the vertical reference; an auxiliary input device positioned in relative proximity to the keyboard; a display positioned adjacent to the keyboard; and software residing in the communications device for providing functionality to inputs received from the auxiliary input device and the keyboard.

According yet to another aspect of the present invention there is provided a handheld two-way wireless communications device as described above, and having an auxiliary input device comprising a thumbwheel in a vertical orientation at the front of the device. In an alternative embodiment, the thumbwheel is inclined from the vertical orientation. The inclined thumbwheel is more easily accessible to either the thumb or index finger of a user's hand at the side edge of the device. Moreover, the easier accessibility allows the user to advantageously hold and operate the device in different ways, namely a single-handed operation and a two-handed operation.

The primary advantage of the present invention is that it enables efficient and user friendly data entry into a palm-sized electronic device by maximizing the potential for user data entry through thumb typing.

These are just a few of the many advantages of the present invention, as described in more detail below. As will be appreciated, the invention is capable of other and different embodiments and its several details are capable of modifications in various respects, all without departing from the spirit of the invention. Accordingly, the drawings and description of the preferred embodiment set forth below are to be regarded as illustrative in nature and not restrictive.

BRIEF DESCRIPTION OF THE DRAWINGS

The present invention satisfies the needs note above as will become apparent from the following description when read in conjunction with the accompanying drawings wherein.

DETAILED DESCRIPTION OF THE INVENTION

Figure 1:
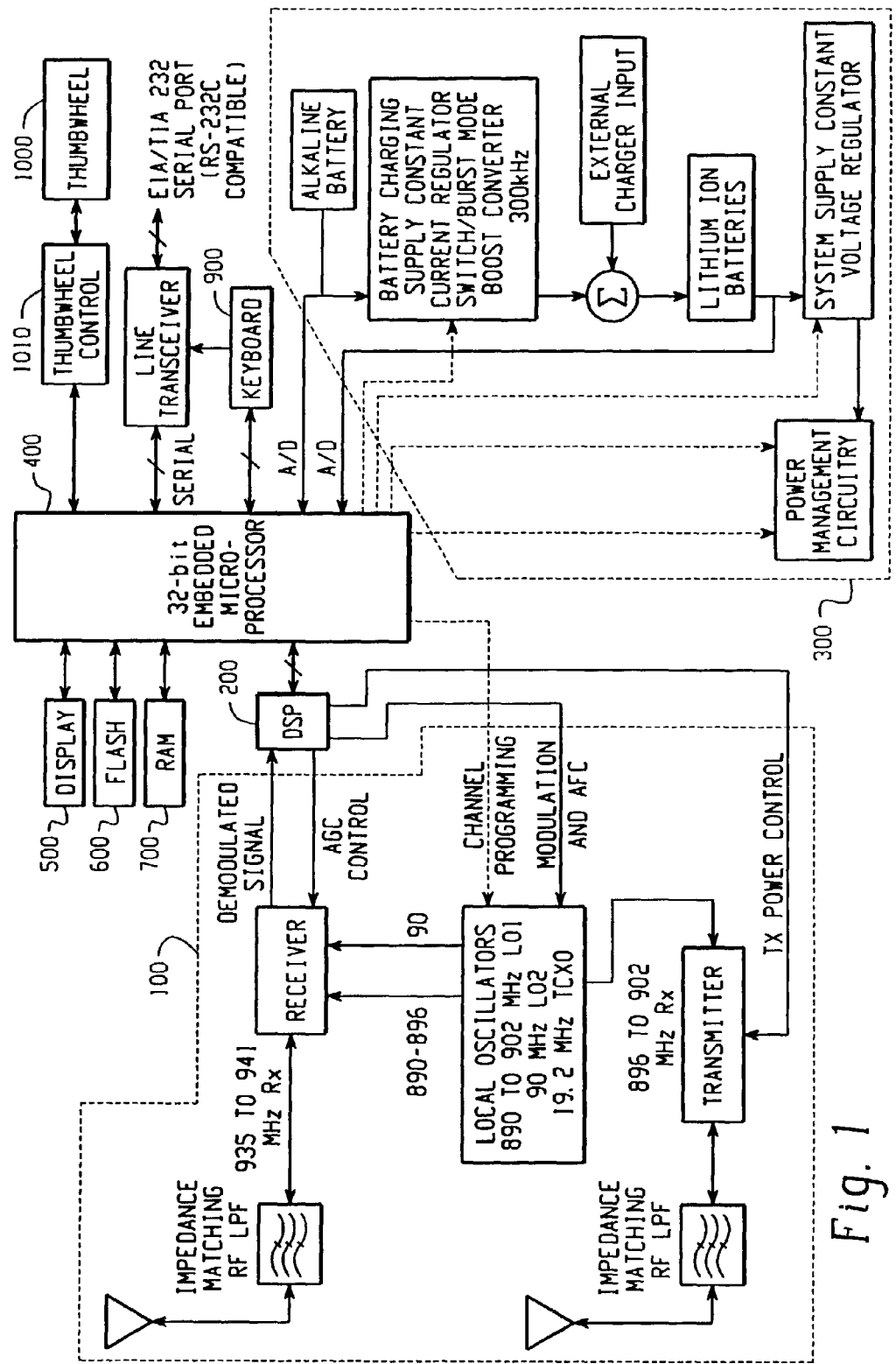
FIG. 1 is a block diagram of a two-way, full-text, messaging device incorporating a keyboard and an auxiliary data entry device.

Referring now to the drawings, FIG. 1 is a block diagram of the major subsystems and elements comprising a palm-sized, mobile, two-way messaging device that preferably incorporates the invention. In its broadest terms, the messaging device includes a transmitter/receiver subsystem 100 connected to a DSP 200 for digital signal processing of the incoming and outgoing data transmissions; power supply and management subsystem 300, which supplies and manages power to the overall messaging device components; microprocessor 400, which is preferably an X86 architecture processor, that controls the operation of the messaging device; display 500, which is preferably a full graphic LCD; FLASH memory 600; RAM 700; serial output and port 800; keyboard 900; thumbwheel 1000; and thumbwheel control logic 1010.

In its intended use, a message comes via a wireless data network, such as the Mobitex™ network, into subsystem 100, where it is demodulated via DSP 200 and decoded and presented to microprocessor 300 for display on display 500. To access the display of the message, the user may choose from functions listed under a menu presented as a result of user interaction with thumbwheel 1000. If the message is an email message, then the user may choose to respond to the email by selecting "Reply" from a menu presented on the display through interaction via thumbwheel 1000 or via menu selection from keyboard 900. In typing the reply, the user can use keyboard 900 to type full text message replies, or insert predetermined or "canned" responses by using either a particular keystroke pattern or by pulling down predetermined text strings from a menu of items presented on display 500 through the use of thumbwheel 1000.

When the reply to the message is composed, the user can initiate the sending of the message preferably by interaction through thumbwheel 1000, or alternatively, with less efficiency, through a combination of keyboard 900 keystrokes. When the microprocessor 300 receives an indication that the message is to be sent, it processes the message for transport and, by directing and communicating with transmitter/receiver subsystem 100, enables the reply message to be sent via the wireless communications data network to the intended recipient.

Similar interaction through the input/ouput (I/O) devices, i.e., the keyboard 900 and thumbwheel 1000, can be used to initiate full-text messages or to forward messages to another party. Also, the keyboard 900 and thumbwheel 1000 can be used to permit data entry to an address book resident on the messaging device, data entry to an electronic calendar or log book, or any other function on the messaging device requiring data entry.

Preferably, the thumbwheel is a thumbwheel with a push button SPST having quadrature signal outputs, such as the thumbwheel manufactured by Matsushita Electronic Components Co., Ltd. as part number EVQWK2001.

Figure 2:
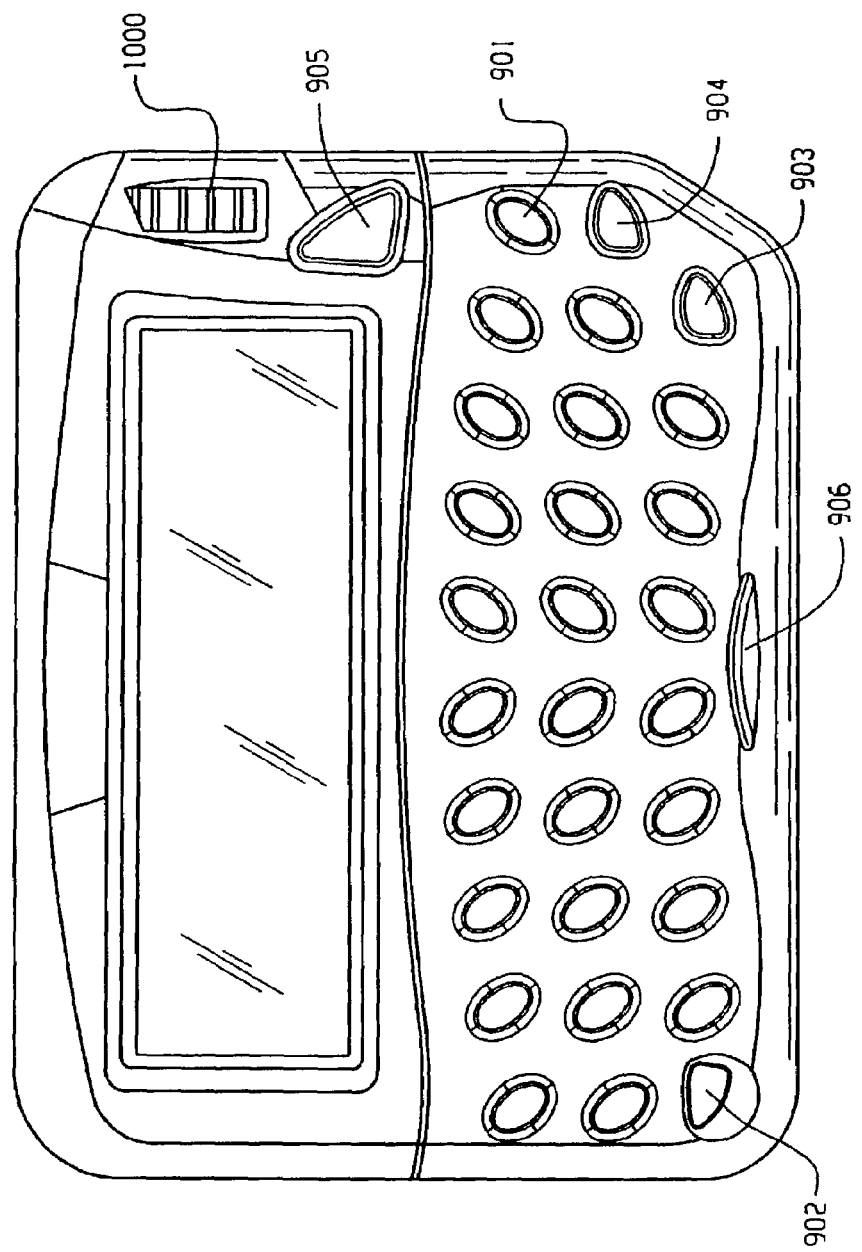
FIG. 2 is a frontal view of the hand-held device showing the shape and placement of the keys on the keyboard and the auxiliary input device.

FIG. 2 is a front view of messaging device 10 that incorporates the invention. The device 10 is shown in FIG. 2 in the ordinary operating/viewing position in which it would be held by and between the user's hands at the left and right side edges 12 and 14 of the device 10. The keyboard 900 is thus elongated horizontally across the front 16 of the device 10.

Shown in FIG. 2 are a plurality of letter keys 901, specialized keys 902, 903, 904 and 905 and space bar 906. Also shown is the thumbwheel 1000 in its vertical orientation at the front side 16 of the device 10 in association with display 500 and keyboard 900. By "vertical" it is meant that the thumbwheel 1000 is oriented with its circular opposite sides 1002 and 1004 in vertical planes when the device 10 is viewed directly from the front in the ordinary operating/viewing position, as shown in FIG. 2. The axis 1005 of rotation extends from left to right across the device 10 as a horizontal line parallel to the lengthwise direction of the keyboard 900. The thumbwheel 1000 can roll about the axis 1005 in an upward direction toward the upper edge 20 of the device 10 or in a downward direction toward the lower edge 22 of the device 10. In the preferred embodiment, specialized key 902 is the alt key, specialized key 903 is the cap key, specialized key 904 is the line feed (blank space) key and specialized key 905 is the backspace key.

Figure 3:
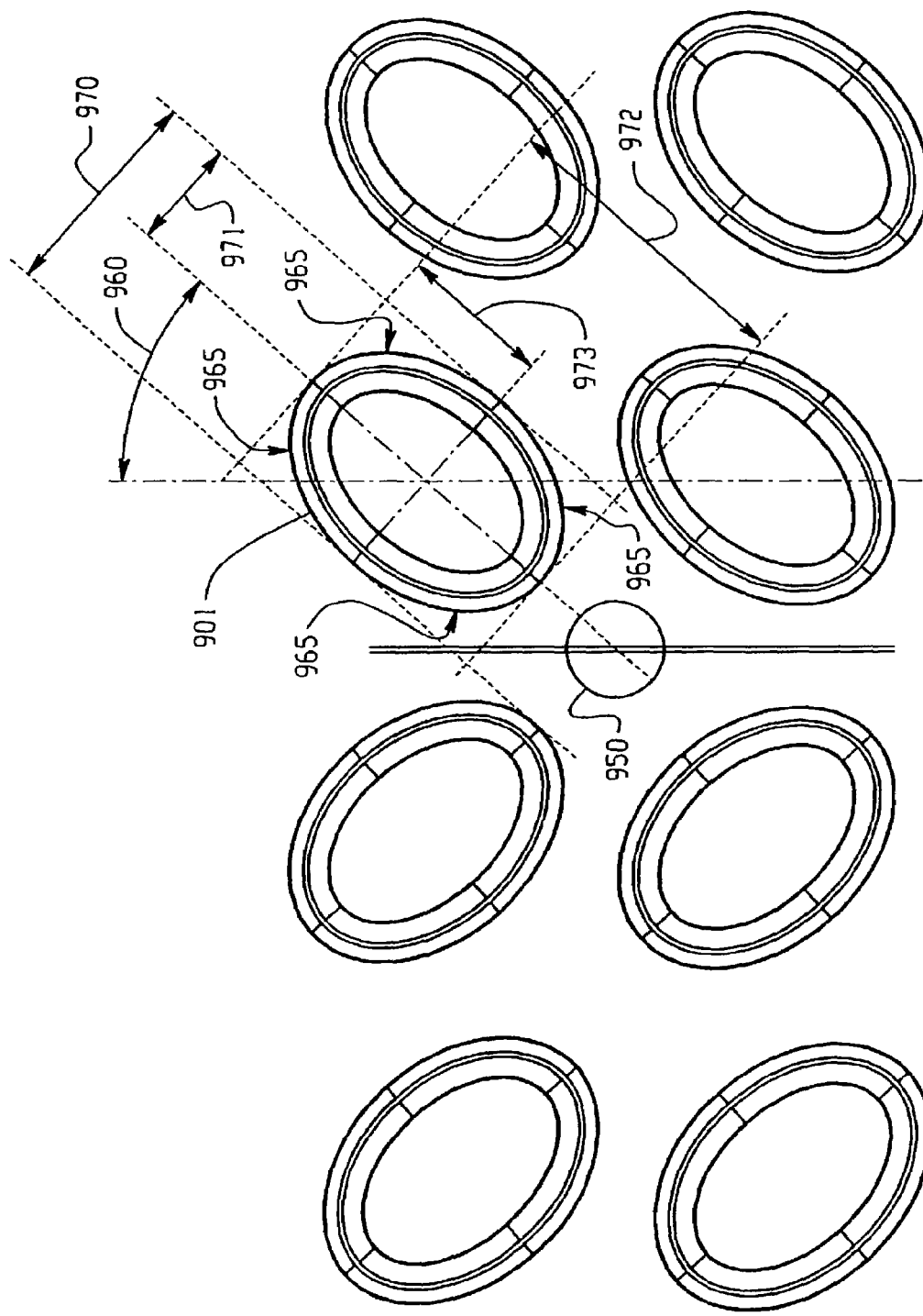
FIG. 3 is a diagram of showing the shape, size and placement of the keys on the keyboard.

FIG. 3 is a view of a subset of the letter keys 901, showing the dimensions and relative position of the keys. Also shown in FIG. 3 is a point 950 that marks the center of the keyboard 900, key dimensions 970, 971, 972 and 973, as well as an angle 960 and rho value 965 that represent the curvature of a letter key 901. In investigating optimal key placement on the keyboard 900, it was determined that the keys should be placed at an angle 960 relative to vertical that facilitates easy typing using thumbs. As described above with reference to the thumbwheel 1000, "vertical" is the direction perpendicular to the lengthwise direction of the keyboard 900 when the device 10 is viewed in its ordinary operating/viewing position, as shown in FIGS. 2 and 3. The angle 960 is preferably positive 40 degrees relative to vertical for keys on the right side of the keyboard (where 950 is the center of the keyboard) and negative 40 degrees for the keys on the left side of the keyboard, although complementary angles ranging from 20 degrees to 70 degrees could also be used to accomplish the goal, albeit less optimally, of facilitating thumb typing. FIGS. 2 and 3 also illustrate that the keys are evenly dispersed across the keyboard 900 so that there is sufficient space between the keys to decrease the opportunity for multiple keys being depressed while thumb typing. Additionally, the keys are sized appropriately given the footprint of the messaging device and the keyboard 900. In its preferred embodiment, the messaging device 10 measures across its face 64 mm by 89 mm, which does not leave much room for keyboard 900 and display 500. In the preferred embodiment, keyboard 900 occupies over one half of the face of the messaging device 10.

The key shape and dimensions are also key components of the invention. In order to maximize the surface area of the key that is depressed by a thumb, the keys are preferably oval, and have a curvature defined by a rho 965 value of 0.414, although values may range higher or lower. Other rho values will lead to an acceptable, but not as optimal or aesthetically pleasing shape of keys 901. As to the key dimensions, the width 970 of the key 901 is 4.8 millimeters (971 representing the radius of half that value, 2.4 min) and the length (or height) 972 of the key 901 is 7 millimeters (973 representing the radius of half that value, 3.5 mm).

Figure 4:
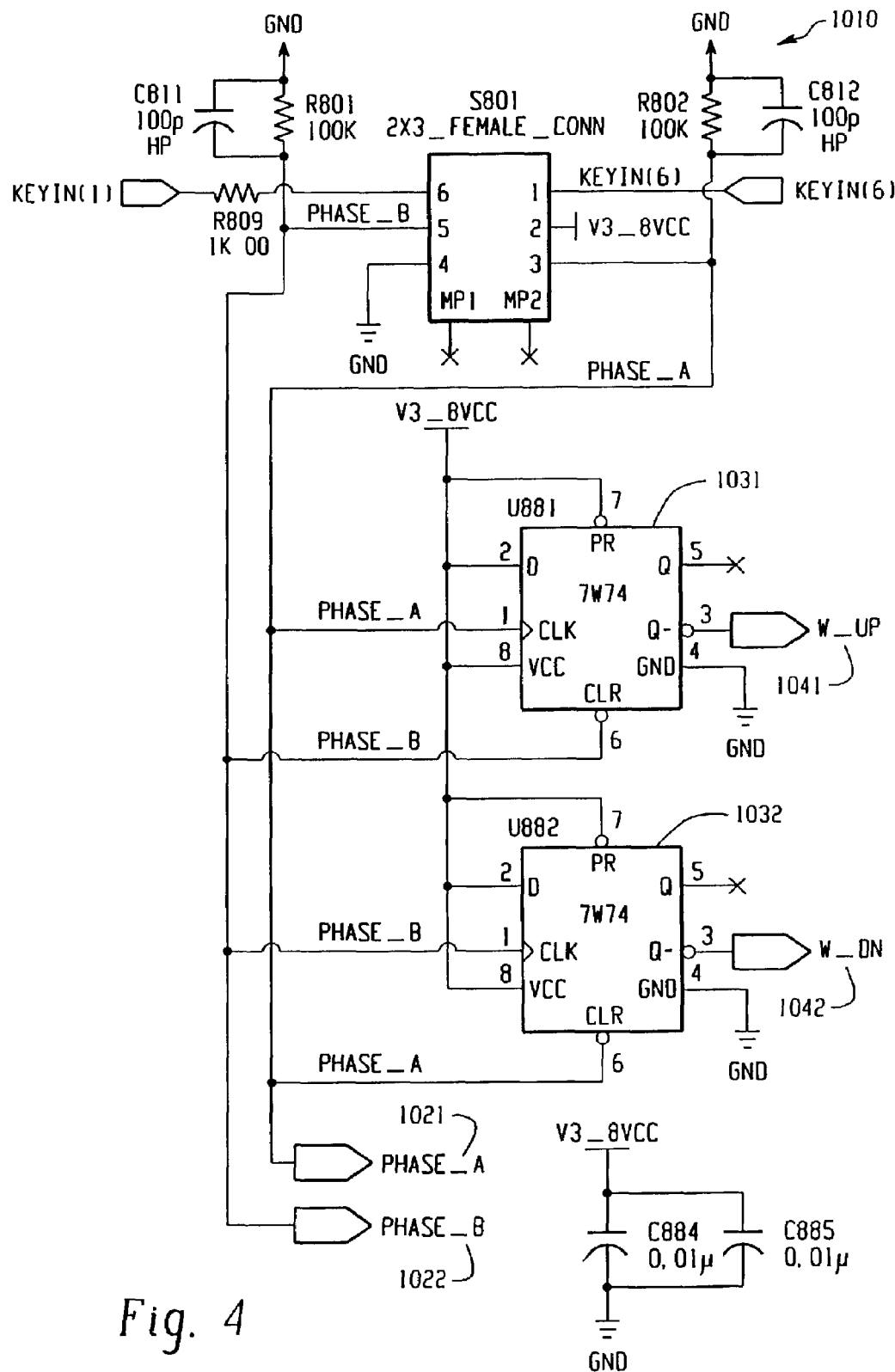
FIG. 4 is a diagram of the control circuitry for the thumbwheel.

FIG. 4 is the logic circuitry 1010 associated with thumbwheel 1000. Thumbwheel 1000 outputs quadrature signals phase A 1021 and phase B 1022, which are processed by D flip-flops 1031 and 1032 to present signals 1041 W_UP and 1042 W_DN to the microprocessor 400. Signals 1041 and 1042 represent, respectively, a user rolling the thumbwheel in an upward direction and rolling the thumbwheel in a downward direction. Preferably, another detectable input movement from the thumbwheel is desirable. One such input movement implementation would produce an additional input signal derived from pushing the thumbwheel toward the rear of the device. Hence, the thumbwheel of the present invention has preferably measurable rotatable and depressible input movements. Although the description that follows is specifically relating to a thumbwheel input device, it is to be understood that other suitable thumb-based auxiliary input devices having multiple input detectable movements are envisioned and are well within the scope and spirit of the present invention.

In a broad aspect of the invention, input entered via keys on the keyboard in conjunction with software residing in the flash memory 600 also facilitates the device's operation with the user's thumbs. In another broad aspect of the invention, input entered via the thumbwheel 1000 and a key on the keyboard in conjunction with software residing in the flash memory 600 further increases the ease, performance, and functionality of the device. These two broad aspects and their specific embodiments will now be described.

Figure 5:
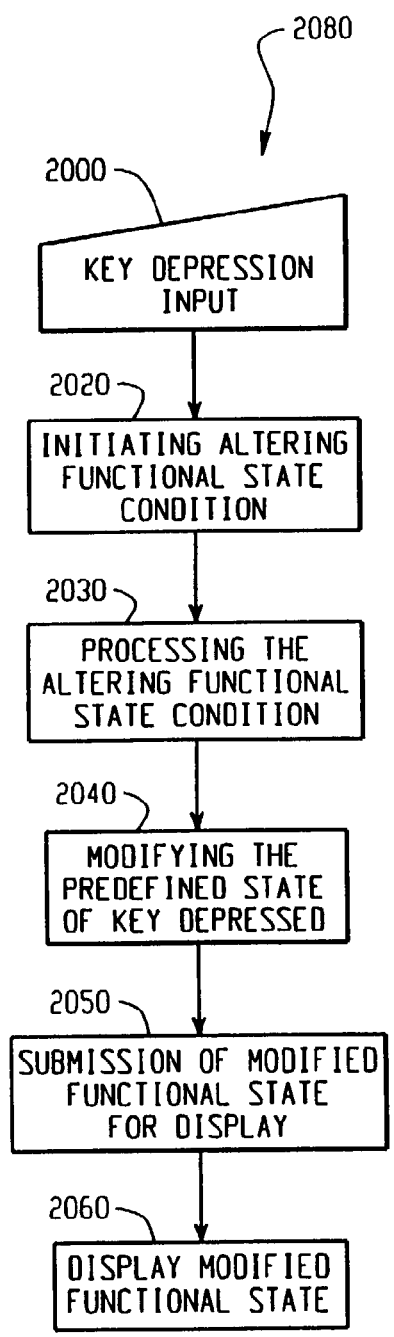
FIG. 5 is a general flow diagram of the major steps of the keyboard-related aspect of the invention.

FIG. 5 is a general flow diagram of the major steps 2080 of the aforesaid keyboard-related aspect of the invention. In the first step 2000, input is entered by depressing a key having a predefined functional state in combination with another key on a keyboard. Depending on the combination of keys depressed, an altering functional state condition is initiated at step 2020. The altering functional state condition is processed at step 2030. Next, the predefined functional state of the key is modified at 2040. In step 2050, the modified functional state is interpreted, and information is displayed accordingly at 2060.

Figure 6:
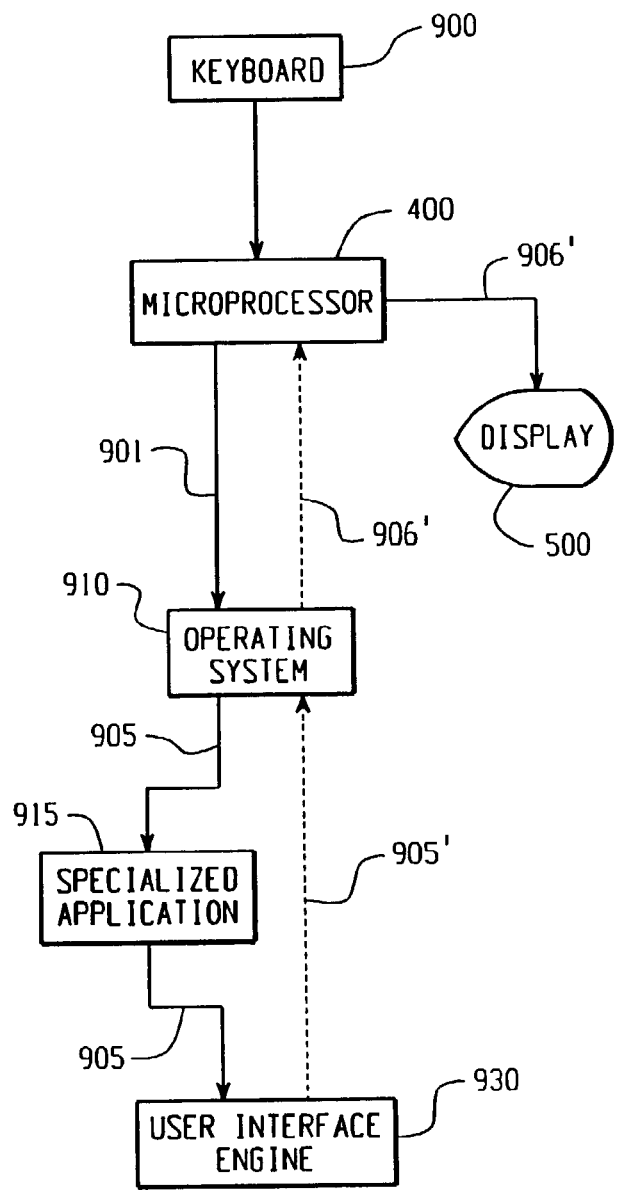
FIG. 6 is a general block diagram of the major subsystems involved in the process described in FIG. 5.

FIG. 6 is a general block diagram of the major subsystems involved in the process described in FIG. 5. In the preferred embodiment of the device, when a key is depressed its predefined functional state 901 is given to the microprocessor 400 and then to the operating system 910. The operating system is responsible for accepting and dispatching user input to a specialized application 915 and providing services to control the display. The modifying step is achieved by a user interface software engine 930 processing the altering functional state condition 905 received from the operating system 910 via a specialized application 915. The modified functional state 905' is then passed to the operating system 910. The operating system acts on the information in a predetermined manner to produce a display 906' representing the modified functional stage of the depressed key.

In the preferred embodiment of the invention, there is a plurality of specialized applications 915 that manage different major features of the device. In such a preferred embodiment, the device includes the following specialized applications: a graphical ribbon application, a message compose application, a transport application, an address book application, a device options application, a cryptographic application and a database application. Other applications are well within the scope and spirit of this aspect of the invention. The applications function directly with the operating system while the user interface engine (albeit another application), in general, provides further specialized functional services to these applications. The user interface engine comprises, in essence, a plurality of modules that each execute at least one different function, and that provide, either alone or in combination with another module, additional functionality to applications using the services of the module(s). For instance, the user interface engine provides an input field that other applications, such as the message compose application, can use to display user input. Additionally, the user interface engine receives, stores, manages and outputs data in a consistent manner to readily perform the various specific features described below. This scheme has proven to be very advantageous because the operating system and the specialized applications may then be limited in their coding overhead, allowing them to be very robust. Some of the unique functions are described in more detail below.

Keypad Aspect Generally

The process logic detail is now described for any keypad event resulting from user input.

When any key on the device is depressed, a keypad event containing the parameters of the particular key is communicated to the microprocessor. In this instance, "any key" includes the thumbwheel in addition to the keys on the keyboard. Preferably, the parameters indicate that a keypad event has occurred and which key has been depressed. The microprocessor communicates the keypad event information to the operating system. The operating system takes this keypad event information and notifies a specialized application of the keypad event information. Since, preferably, the specialized application is blocked waiting for such a keypad event, the application is awakened, examines the keypad event information, and passes the keypad event information to the user interface engine for further processing. In essence, the keypad event information is passed to the user interface engine from the operating system via the specialized application: the specialized application in this case acts as a conduit for information flow. In other instances, the specialized application may pre-process the keypad event information before passing the information to the user interface engine.

Based on the keypad event information provided to the user interface engine, the user interface engine then acts in a pre-determined functional manner. The pre-determined functional manner preferably includes processing the keypad event information and updating stored display data to provide output instruction data. The user interface engine submits the output instruction data to the operating system. The operating system then acts according to the instructions in the instruction data, which in most cases instructs the operating system to submit a representation of the keypad event for display. The output instruction data preferably includes instructions as to where characters are to be displayed within the display and a character code reference value indicating which character should be displayed on the display. In other cases, a plurality of character code references may be provided for producing a display of a string of characters. The preferred character code reference is the standard Latin One Code Set. The operation system executes the instructions by mapping the appropriate characters from its internal bitmap of characters into the appropriate locations on the display.

Auxiliary Input Device Aspect

Figure 7:
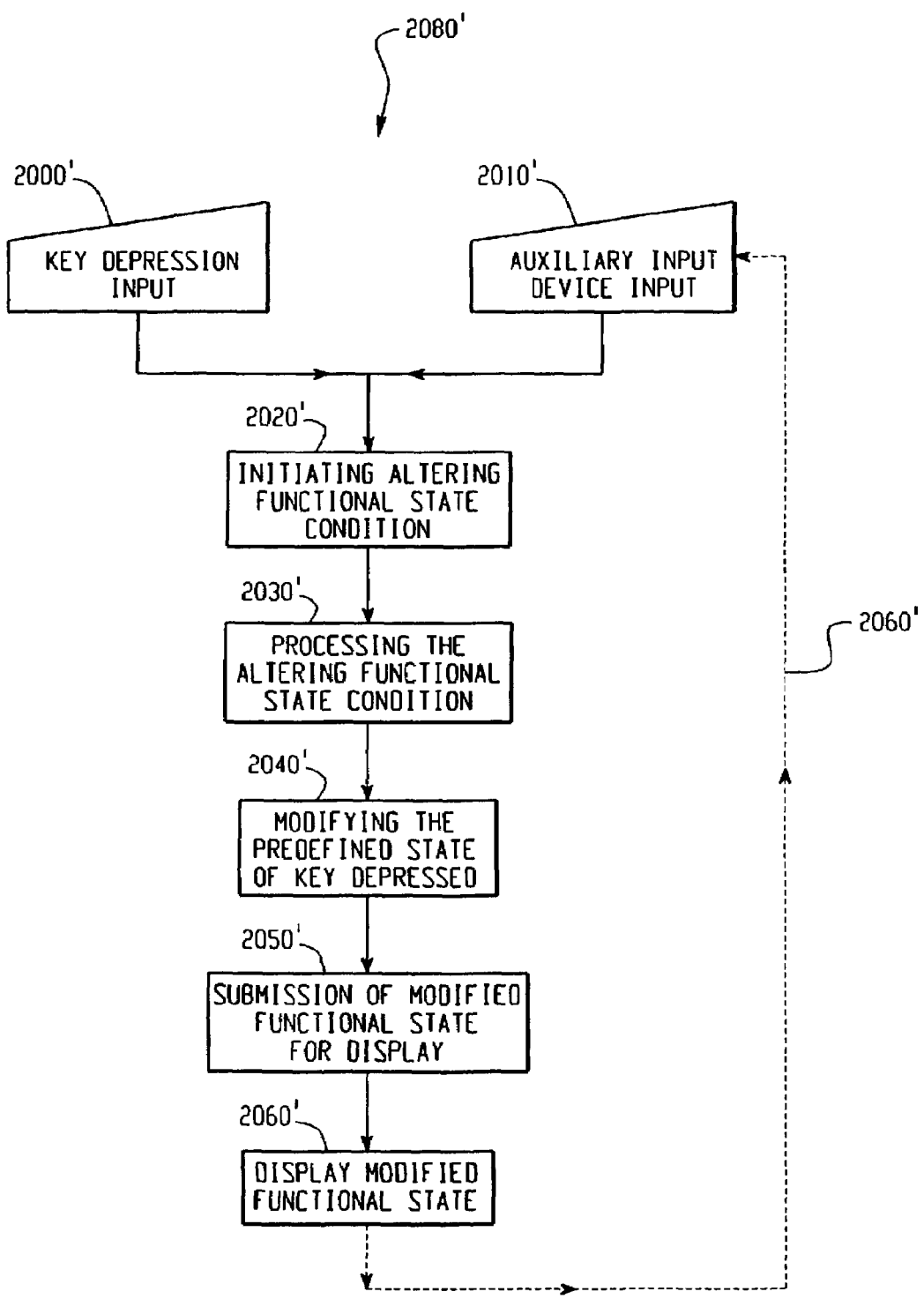
FIG. 7 is a general flow diagram of the major steps of the thumbwheel-related aspect of the invention.

FIG. 7 is a general flow diagram of the major steps 2080' of the auxiliary input device-related aspect of the invention. At step 2000', a first input is entered by the depressing a key on a keyboard having a predefined functional state. Next, in step 2010', a second input is entered from the auxiliary input device in conjunction with the depression of the key in step 2000'. The combined effect of the first and second inputs initiates an altering functional state condition at step 2020'. The altering functional state condition is processed at step 2030' and the predefined functional state of the key is modified at step 2040'. The modified functional state is then submitted for display at step 2050'. Additional modified functional states are accomplished by receiving further inputs 2060' from the auxiliary input device while the depressed key is continued to be depressed.

Figure 8:
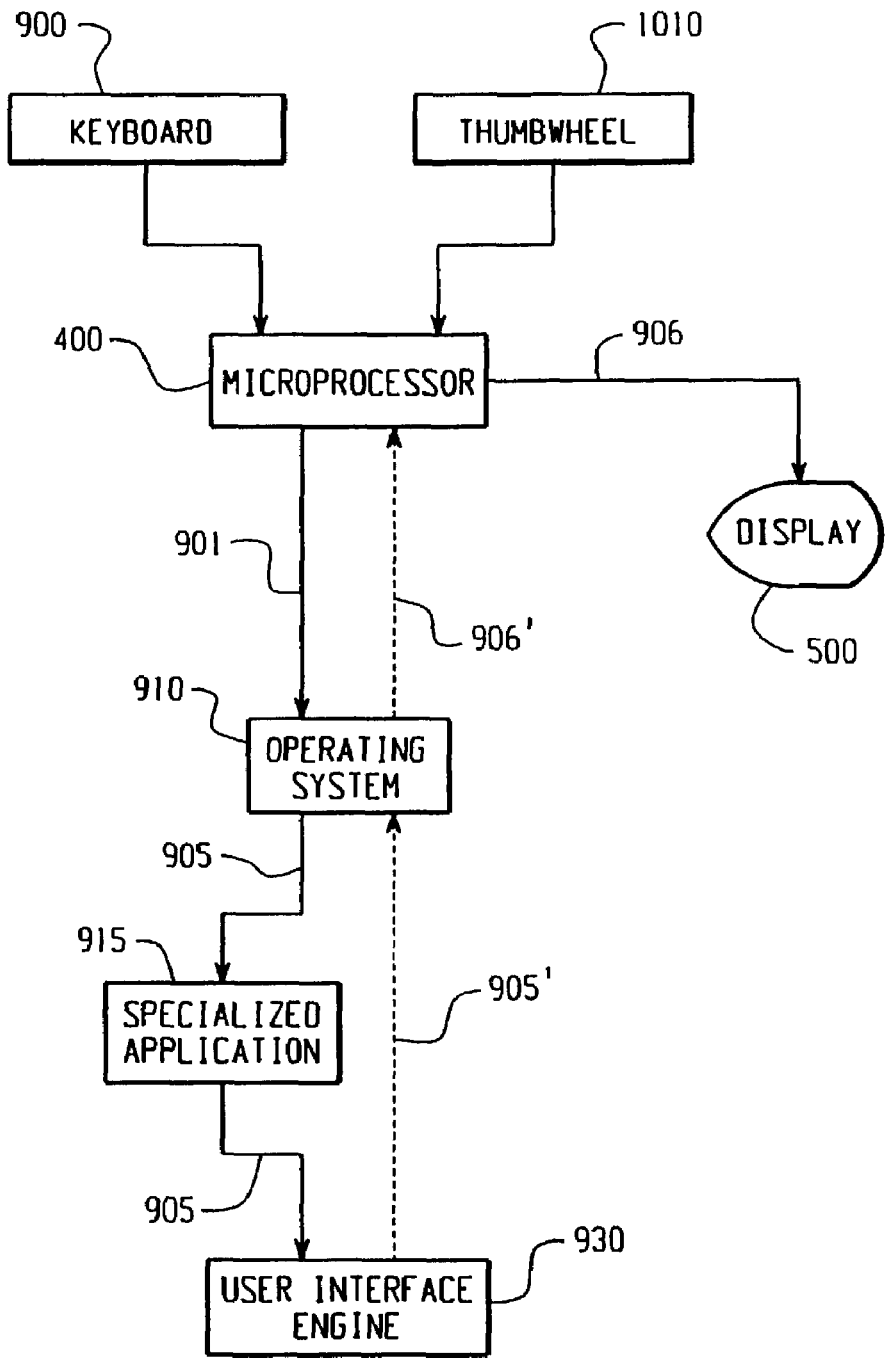
FIG. 8 is a general block diagram of the major subsystems involved in the process described in FIG. 7.

FIG. 8 is a block diagram of the major subsystem involved in the process described in FIG. 7. FIG. 8 is similar to FIG. 6 save for input from the auxiliary input device subsystem that contributes to the altering functional state condition. This aspect of the present invention has proven extremely useful in optimizing the functionality of the handheld device by operation of the device with only the user's thumbs.

International Character-Scrolling Feature

Turning now to a specific embodiment of the aforesaid auxiliary input device-related aspect of the invention, the user interface engine, the thumbwheel and at least one key on the keyboard may be utilized to insert international characters into a user input field such as the input field provided by the user interface engine. In general and preferably, the user first presses and holds down a key with the desired associated international characters while the thumbwheel is rolled. For each rolled input from the thumbwheel, a different international character associated with the depressed key is outputted on the display as a substitute for the previous character displayed. There is preferably a plurality of international characters or symbols associated with every key on the keyboard. When the desired character is displayed, the user releases the depressed key and the desired character remains on the display. Traditional means to select such international characters require a number of additional input steps or the availability of additional keys on the keyboard—requirements undesirable with the present handheld device.

With reference to FIG. 8, the international character-scrolling feature begins with the depression of a key on the keyboard 900 in conjunction with input from the thumbwheel 1010. The input from the thumbwheel is preferably accomplished by rolling the thumbwheel in either the up or down direction. The combined effect of inputs 901 from the key and the thumbwheel produce an altering functional state condition or a special keypad event 905. The parameters associated with this special keypad event 90 include data descriptors that will indicate whether the thumbwheel was either rolled up or down and which key on the keyboard was depressed. The user interface engine 930 processes the special keypad event information by indexing through an array containing references to the international characters associated with the depressed key. The processing incrementally indexes up or down the array (depending on the thumbwheel scroll direction parameter), stores the current array position where the indexing stopped and retrieves the character reference code information stored in the current array position. Preferably, at each index increment, output instruction 905' is submitted to the operating system 910 for display on the display 500. The output instruction preferably includes the reference character code and the location of the character to be displayed on the display. Based on this output instruction, the operating system outputs at the appropriate location a bitmap image 906' for a given reference code from its internal bitmap. If the user chooses to see the next international character associated with the depressed key, the user 20 provides an additional rolling input while continuing to depress the key. This produces a second special keypad event thereby initiating the altering functional state process. Consequently, the above process is related. The user interface engine processes the keypad parameters from the second special keypad event by further indexing in the appropriate direction by one element from the previously store position within the array. Again, the user interface engine submits to the operating system sufficient information to display the next associated international character retrieved from the array. Further inputs from the thumbwheel would simply repeat the processing until all international characters associated with the depressed key are indexed through after which time the indexing returns to the top of the array.

Although the above description refers to modifying the default character of the key depressed with an international character it is to be understood that the application of this aspect of the invention can equally be applied to modifying the functional state of the depressed key. For instance, a certain special keypad event defined by a certain key depressed in conjunction with input received from the thumbwheel could trigger a macro to be executed thereby altering the functional state of the depressed key. In this instance, a macro is a single instruction provided by the scrolling feature that expands automatically into a set of instructions to perform a particular task. In another instance, the altered functional state of a key could produce any one of the following: a larger font for the display; change the default font type; change subsequent text to bold or italics; cause certain text to blink in a received email transmission;

and reverse image certain text iIn another instance, the altered the functional state of a key could provide the user with "canned" or pre-set messages that could be readily be used for the purposes of quickly responding to a received message. In another instance, the context of the current active display area of the device may either add, or alternatively, suppress associated altered states. For example, when a user is in the reply-to-message screen display, depression of the letter "M" with the scrolling input from the thumbwheel would produce an ellipsis or the display as the altered functional state. In contrast, the same key and thumbwheel sequence would instead result in a macro sequence to execute in the options screen display.

Capitalization

Turning to another software-related feature that aids in the device 10 being optimally used for thumb typing is a capitalization feature implemented via software. If a user depresses a key 901, the operating system detects a key down event. If the key is released after a period of time, the operating system detects a key up event. If after a key down event, a certain period of time elapses before a key up event is detected, the operating system determines that a key repeat event has occurred representing a situation where a user has continued to depress a key without releasing it. A key repeat event is then treated by application software residing in either flash 600 as an event that requests the capitalization of the key previously depressed. This feature disables the key repeat feature and substitutes instead a capitalization feature based on the length of a key press. The timing of the key scanning to determine whether a key has been released can be set to permit a slower keyboard response or a faster keyboard response, depending upon user experience of preferences.

Although the capitalization function preferably works only to change the state of a letter to a capital, it alternatively could operate to change a capital letter to a lower case letter. The actual display image is changed by the operating system mapping appropriate bitmapped characters as instructed by the user inter-race engine. As alternatively implemented, the continued depressing without release of a letter key could result in a key oscillating between upper case and lower case, depending on the length of time the key is depressed.

Automatic Formatting Features

Now follows a description of another software-related aspect of the present invention that is implemented to specifically minimize the number of keystrokes required as input by the user in using the device. In some cases, two software engines handle this software-related aspect, namely the user interface engine and an autotext engine. The user interface engine by using the above-mentioned functional modules facilitates presenting common interface elements such as menus, lists and textboxes. The autotext engine is another software application that extends the user interface engine and makes use of a database to perform text insertions and other related activities. The autotext engine is preferably implemented as a user interface engine element (such as a choice box or list or standard edit element). This arrangement of being a user interface engine element allows specialized applications to incorporate a buffer that performs autotext substitution as they would a standard input field. However, because of the substantive amount of code associated with the autotext engine and the engine's need to be configured with a list of replacement strings, the engine is preferably implemented as a separate module. One specific advantage that flows from the specific embodiments of the engines as described herein is that there is a substantial reduction of input formatting by the user, since automatic formatting can be triggered by a small number of keystrokes, or by predefined key sequences entered one key at a time.

Autopunctuation

Another embodiment of the user interface engine is the "autopunctuation" feature of the device. If the user enters one of a number of predefined character sequences, the user interface engine will automatically insert a period (full stop) in the user input field. In this manner the user does not need to use the alt key to enter a period. An example of one such character sequence would be <character><space><space>, after such character sequence the user interface engine will instruct the operating system to replace the first <space> with a full stop and to capitalize the next character entered by the user. For clarity, in this description: <space> represents a blank space user input; <character> represents any character user input; and, <period> represents user input of the character ".". Because of bandwidth considerations when the device transmits data to the wireless network, it is preferable that only one space, instead of two, is present between the period and the first character of the next sentence. Alternatively implemented, instead of replacing the first <space> in the aforesaid character sequence, a period is inserted after the <character> and the next character entered by the user is capitalized thereby producing two spaces between the period and the next character. In another embodiment of this autopunctuation feature, if the user enters one of a number of predefined character sequences that is used as a capitalization signal, such as <period><space>, the user interface engine will process the event and capitalize the next character entered by the user.

Alternatively implemented, the predefined character sequence could be <period><space><space>. To further enhance this feature, autopunctuation can be undone easily, as described bellow.

Character Substitution

Another embodiment of the user interface engine is the "intelligent character substitution" feature of the device. In fields designed for certain types of input, the user interface engine will automatically substitute appropriate characters if inappropriate characters are entered. For example, in a field designed to hold an email address, a method of composing an email address is provided by the character substitution feature of the present invention for an email address taking on the general form <characters>@<characters>.<characters>. In this instance, it is assumed that blank spaces are unacceptable characters for an email address field. The method begins with the user interface engine receiving from user input a character set representing a certain portion of the email address. If a first delimiter trigger signal, preferably a first blank space, is received from the user input, the engine confirms that no at-sign character ("@") has been entered in the already received character set. If no, the engine substitutes the first delimiter trigger signal with a first email delimiter, preferably the at-sign character. If yes, the engine substitutes the first delimiter with a second email delimiter, preferably a period character. For any subsequent blank space input received, the engine substitutes preferably another period character.

Another example of the character substitution feature occurs when entering data in a field designed to hold numeric data. If the user presses an alphabetic key with a corresponding alt character that is a numeral, then the user interface engine will recognize this and instruct the operating system to automatically insert the numeral into the field, even if the user had not pressed the alt key.

Phrase substitution

The first embodiment of the autotext engine provides an application service for error correction and phrase substitution. By entering pairs of strings into an autotext database, the user can associate "original strings" with "replacement strings". The autotext engine also defines an autotext input field that applications may use to access the functionality of the autotext engine. The autotext input field may be of variable length, typically up to the length of an email message. As the user is entering data into an autotext input field, each time a space is entered, the autotext engine will search backwards from the current cursor position to extract the last word from the autotext input field. The autotext engine will then efficiently search through the autotext database for an original string that exactly matches the last word. If such a string is found, then the last word in the autotext input field will automatically be replaced with the corresponding replacement string from the database.

This phrase substitution feature could be used to correct common typing errors (for example, "teh" could be automatically converted to "the") or to facilitate the entry of common phrases (for example, "fyi" could be automatically converted to "for your information"). This feature could also automatically insert a regularly used international character or symbol in a message thereby reducing the instances when the international character-scrolling feature needs to be used. In this latter scenario, the original string could be "jr" and the associated replacement string could be "Jürgen". The international character would be entered as described before for the international character—scrolling feature.

The phrase substitution feature could advantageously be used for electronic signatures to be appended to the end of an email message composed by the user on the device. Advantageously, a variety of different electronic signatures can be stored in the autotext database. In this manner, the user may chose the appropriate signature from his set of signatures for the particular context of the email message about to be transmitted. For instance, in one case the user in an informal message may sign off "Take Care & Cheers" with the original string "tc" while in a legally sensitive message the same user may sign off "Solicitor-Client Privileged Communication" with the original string "scp". In this manner, there is no need for any electronic signature field insertion at the gateway of the wireless network and the user may amend and modify his electronic signatures without network interaction. In the preferred embodiment, the replacement string is case sensitive in that any preset capitalization in the replacement string appears when displayed and cannot be forced into a lower case by the case status of the original string. However, if the first character of the original string is upper case, then preferably the first character of the replacement is forced into an upper case as well.

In another embodiment, the autotext engine preferably includes a macro functionality that allows a user to specify special character codes in the replacement string that will be treated specially when the replacement string is entered into the autotext engine. These codes are preferably divided into two distinct sets: control character codes and dynamic data codes.

In the control character code situation, some character sequences in the replacement string will be converted into control characters when the original string is replaced by the substitution feature. Examples of these sequences would be "% b" and "% B" which convert to a backspace character and a delete character respectively. Therefore, for an open bracket "(" to be displayed, the original string could be defined as "br" and the replacement string as "(% B". Likewise, for a close bracket ")", the original string could be "rb" and the replacement string "% b)".

In the dynamic data code situation, certain character sequences in the replacement string will be converted to dynamic data when the original string is replaced. Examples of these sequences would be "% t" and "% d" wherein the codes are converted into the current time and current date respectively.

Like the intelligent character substitution feature, autotext replacement can be undone easily, as described bellow.

Undo Feature

As mentioned above, all automatic formatting features of the user interface and autotext engines such as autocapitalization, autopunctuation and phrase substitution may be overridden by what is referred to as the "easy undo" feature herein. The automatic formatting features have undo capabilities that are triggered by backspacing over a significant character. As such, if the user backspaces over one of these significant characters, then the formatted data is replaced with the raw data as it existed prior to automatic formatting.

For instance, the user may type "fyi" into an autotext input field such as the message compose screen. Then, if the user types <space> and "fyi" in the autotext database, the autotext engine will replace "fyi" with "for your information" in the input field as described above in the phrase substitution section. If the user does not desire this substitution, then the user can preferably backspace over the last character of the displayed string "for your information". Consequently, the autotext engine will restore the contents of the input field to "fyi" as they were prior to the phrase substitution formatting operation. In this instance, the significant character was the last character "in" in the phrase "for your information".

If the user types a sequence of characters that results in an automatic formatting operation, and backspaces to activate the easy undo feature, then the appropriate engine will retain the fact that an undo operation took place at that significant character position. Consequently, if the user retypes the same sequence of characters, then the automatic formatting will not be applied for a second time. This allows the user to suppress an automatic formatting feature when desired.

For example the user may suppress the autopunctuation feature from inserting a full stop automatically. As described above, if the user types <space><space> in an input field, a full stop will be inserted by the user interface engine for the first <space>. If the user does not desire a full stop in that location, then the user would backspace over the full stop character and retype <space><space>. The user interface engine will not replace the full stop as it did the first time.

Navigation Aids

The device software provides a number of navigation aids for most user input tasks. The navigation aids maximize the likelihood that there will be a graphical interface that the user finds intuitive. The aids allow most input tasks to be performed completely using either the keyboard or the thumbwheel. The navigation aids are preferably incorporated into choice boxes and menus of the device software. A choice box is a graphical interface wherein only one selection is displayed at one time. The other possible selections are displayed one at a time by a navigation means. A menu, on the other hand, is a graphical interface wherein all selections for a particular input are displayed at one time. There are other instances where the navigation aids may be used and such applications are within the scope of the invention.

As a first aid, the user may cycle through all available options in a choice box by pressing the space bar. For instance, in a box containing the months of the year, pressing the space bar repeatedly will change the selection from "January" to "February" to "March", etc. A keypad event, defined by the location of the cursor being in a choice box and the depression of the space bar, would trigger the altering functional state process. As a result, the user interface engine would process the event by indexing though a choice array associated with the choice box and provide to the operating system instructions to display the next available option.

As a second aid, the user may also cycle through the data by pressing a control key and rolling the thumbwheel. The control key is preferably the "alt" key 902. Other control keys are possible and within the scope of the invention. This navigation method allows more flexibility for the user because the user can cycle through data in either direction in the choice array. This navigation is similar to the aforesaid international character-scrolling embodiment. Instead of international characters associated with the key depressed, the software displays a list of options. Preferably, in the downward scrolling direction, the user interface engine will move through the list of choices in the same direction as it would have if the space bar had been pressed. In the upward scrolling direction, the user interface engine will move backwards through the list of choices (e.g. "March" to "February" to "January", etc.). Hence, the alt key's defined function of producing for display an alternate character for a key has been altered by the keypad event triggered by the thumbwheel and the alt key inputs. In the case of a menu display, the user can move the cursor between items in the menu by depressing a character key. If a menu item exists beginning with the character, then the cursor is positioned automatically over the first item in the menu beginning with that character. If there are multiple menu items beginning with that character, pressing the key repeatedly cycles the menu through the menu items. When the cursor is positioned over the desired item, the user can select the item by pressing the Enter key. If the user decides that he does not want to select any menu item, but would instead like to return to his previous position in the application, then he can again select the "Hide Menu" item or press the backspace key, and the menu will be dismissed.

Another navigation aid is available when the cursor is positioned over a specific choice box that changes options by allowing the user to cycle through the options in the choice box by only rolling up or down without depressing the alt key. Similarly, when a menu is displayed, the user can move the cursor up or down in the menu by rolling the thumbwheel, respectively, up or down. When the cursor is positioned over the desired menu item, the user can select the menu item by pressing the roller wheel toward the back of the device (called clicking the wheel). If the user decides that he does not want to select any menu item, but instead desires to return to his previous position in the application, preferably, he can select the "Hide Menu" item, and the menu will be dismissed. Preferably, the user can also dismiss the menu by pressing the backspace key.

Another navigation aid utilizes the uniqueness of the first character of each choice listed in a choice box. If the user depresses a key and there exists a possible choice beginning with the character represented by the key, that choice will automatically be selected without any further input required by the user. If there are multiple choices beginning with that letter, then pressing the key repeatedly will cycle through the available choices. For example, in a month choice box, pressing "j" will first select "January", then "June" and then "July". Alternatively implemented, rapid keystrokes could result in a narrower search. For instance, rapidly pressing "ju" would result in "June" and then "July".

Thumbwheel Orientation

As described above with reference to FIG. 2, the communications device 10 has a vertical thumbwheel 1000. As shown in FIGS. 9–12, an alternative embodiment of the invention comprises a device 4000 with an inclined thumbwheel 4002.

Figure 9:
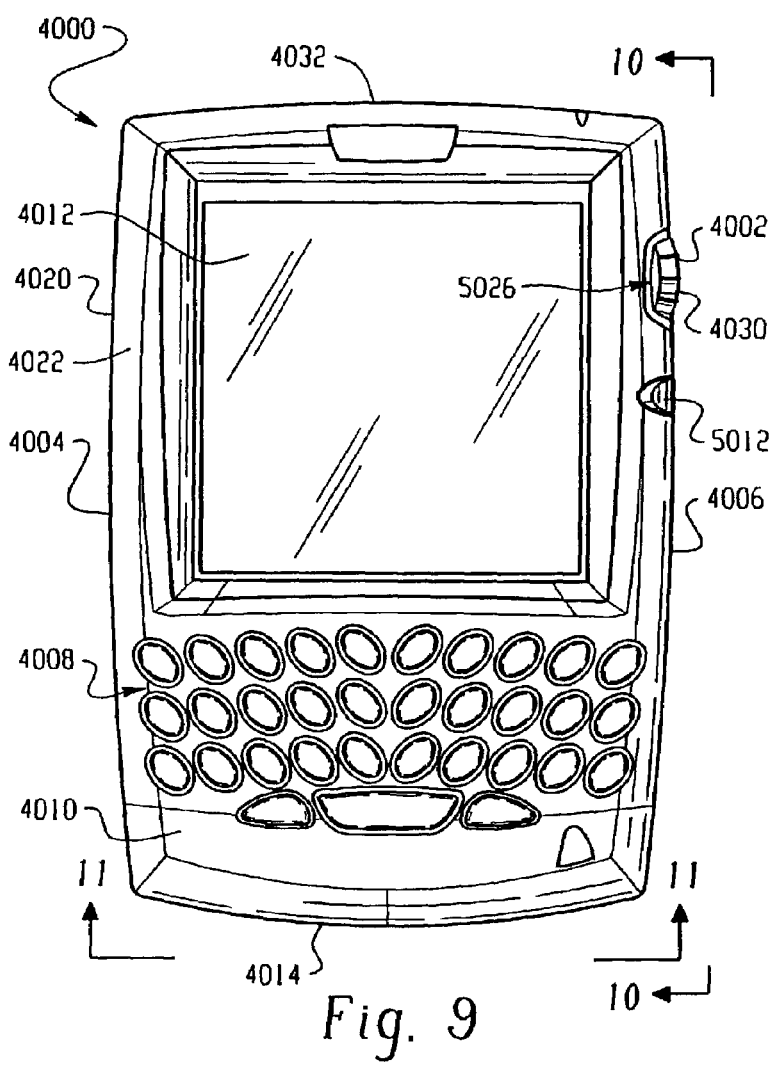
FIG. 9 is a view similar to FIG. 2 showing a hand-held device comprising an alternative embodiment of the invention.
Figure 10:
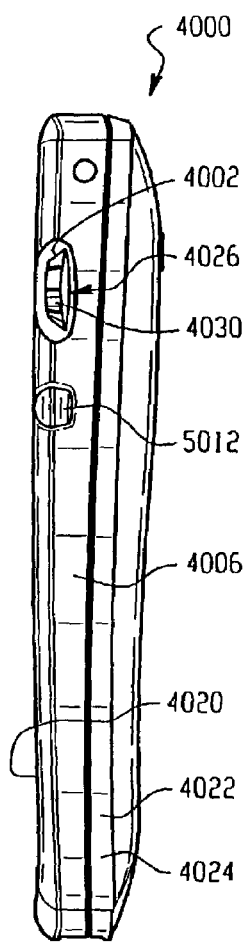
FIG. 10 is a view taken on line 10—10 of FIG. 9.

Like the device 10, the device 4000 is a hand-held communications device which, as viewed directly from the front in FIG. 9, has an ordinary operating/viewing position in which it is normally held by and between the user's left and right hands at the left and right side edges 4004 and 4006 of the device 4000. The keyboard 4008 is thus elongated horizontally across the front 4010 of the device 4000 at a location between the display 4012 and the lower edge 4014 of the device 4000. Further like the device 10, the device 4000 includes a microprocessor with a software application for providing a plurality of thumb-based operational features upon certain inputs from the keyboard 4008 and the thumbwheel 4002, as described above.

The housing 4020 of the device 4000 has front and rear sections 4022 and 4024. The thumbwheel 4002 projects outward through a slot-shaped opening 4026 in the front section 4022 of the housing 4020. The opening 4026 interrupts the corner of the housing 4020 between the front 4010 and the right side edge 4006 of the device 4000, and is elongated lengthwise of the right side edge 4006. The opening 4026 is thus configured to provide clearance for the thumbwheel 4002 to project from both the front 4010 and the right side edge 4006 of the device 4000 in its inclined orientation. This places the peripheral surface 4030 of the thumbwheel 4002 in an orientation in which it is clearly visible from directly in front of the device 4000 when a user holds the device 4000 in its ordinary operating/viewing position, as shown in FIG. 9. Importantly, the peripheral surface 4030 of the thumbwheel 4002 is easily accessible, i.e., reachable, by the right thumb at the front 4010 of the device and also by the right index finger when the device is held, preferably, in the palms of two hands. Also, the peripheral surface 4030 of the thumbwheel 4002 is accessible by the right thumb at, for instance, the right side edge 4006 of the device when the device is held in one hand. The present invention provides optimum positioning between a vertically-aligned thumbwheel and horizontally-aligned thumbwheel; thereby, allowing the user to operate the thumbwheel in either a single-hand operation or two-handed operation.

Figure 11:
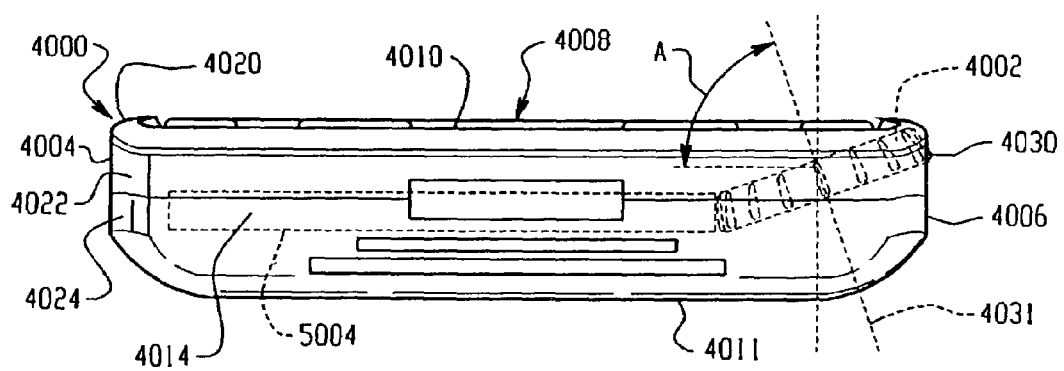
FIG. 11 is a view taken on line 11—11 of FIG. 9.

As best shown in FIG. 11, the thumbwheel 4002 is inclined at a specified angle A from the vertical orientation of the thumbwheel 1000 (FIG. 2). The angle A is preferably 70 degrees. With its axis 4031 of rotation in this orientation, the thumbwheel 4002 can roll up toward the upper end 4032 of the device 4000, and down toward the lower end 4014, in a manner similar to the up and down rolling movement of the thumbwheel 1000. However, the rolling movement of the thumbwheel 4002 also has directional components extending across the front 4010 of the device 4000 between the opposite side edges 4004 and 4006 as a result of its inclination from the vertical orientation of the thumbwheel 1000. This enhances the ability of the user to manipulate the thumbwheel 4002 with either the thumb or index finger of the right hand.

Figure 12:
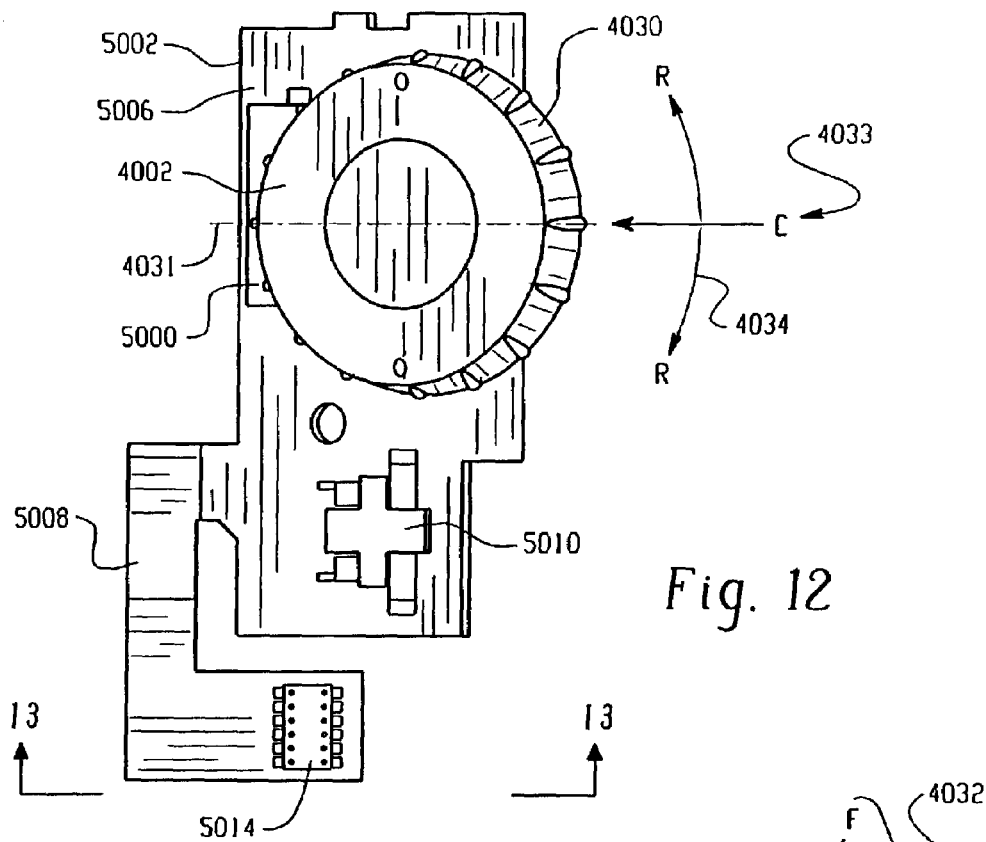
FIG. 12 is a front view of parts of the device of FIG. 9.
Figure 13:
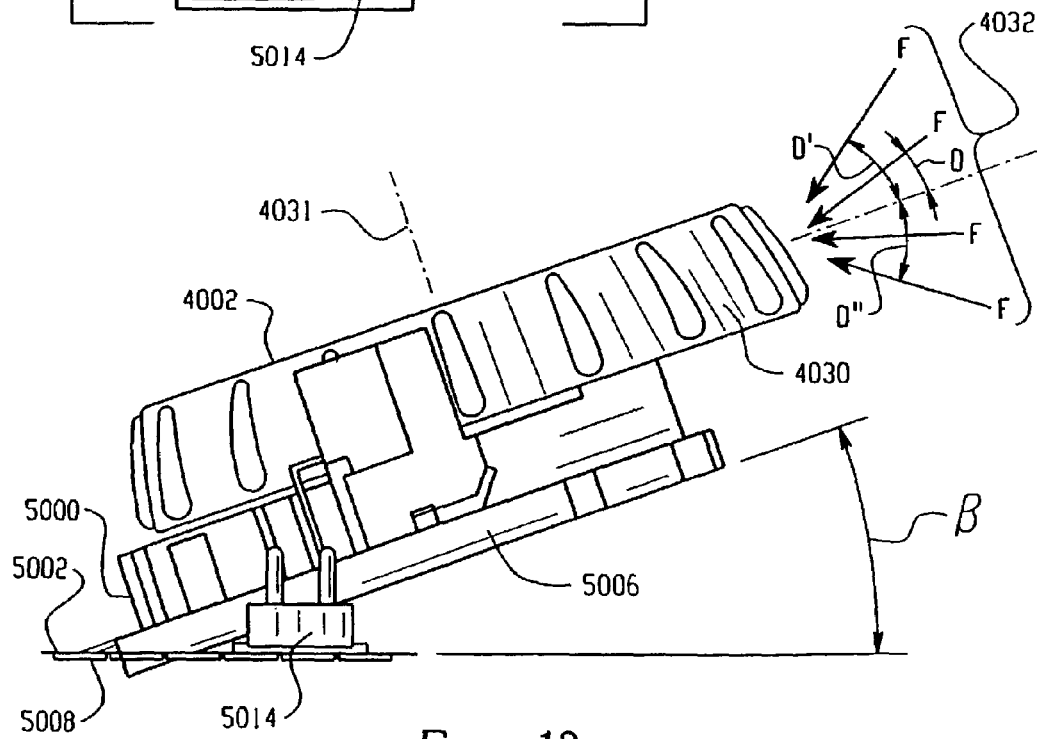
FIG. 13 is a view taken on line 13—13 of FIG. 12.

A structure for supporting the thumbwheel 4002 within the housing 4020 is shown in FIGS. 12 and 13. An important advantage of the inclined thumbwheel 4002 is that thickness of the housing (i.e., the distance between the front surface 4010 and the rear surface 4011) is minimized; thereby, allowing the overall dimensions of the device 4000 to be sleeker than if the thumbwheel 4026 were vertically positioned. The supporting structure includes a rollerwheel switch assembly 5000 and a printed circuit board (PCB) 5002. These parts 5000 and 5002 are configured to interconnect the thumbwheel 4002 operatively with the main PCB 5004 (shown schematically in FIG. 11).

The PCB 5002 has first and second portions 5006 and 5008. The two portions 5006 and 5008 of the PCB 5002 are inclined relative to each other at a specified angle B which is complementary to the angle A of FIG. 11. In the preferred embodiment, the angle B is 20 degrees. The rollerwheel switch assembly 5000 supports the thumbwheel 4002 on the first portion 5006 of the PCB 5002 for rotation about the axis 4031, as indicated by the R arrows 4034, and also for clicking input movement in a direction perpendicular to the axis 4031, as indicated by the C arrows 4033 shown in FIG. 12. An additional advantage of the present invention is the ability to execute the clicking input movement in a plurality of angular positions of the user's thumb or index finger as illustrated by the input arrows F 4032 and associated angles D, D', and D" in FIG. 13. All that is required to engage the rollerwheel switch assembly 5000 to acknowledge a clicking input movement is sufficient force in the direction perpendicular to the axis 4031. In this manner, some of the additional advantages described above relating to easy access via a single-hand or a dual-hand mode operation of the device 4000 is further enhanced. The plurality of angular positions by which the user may engage the thumbwheel 4002 for input allows for greater freedom and ergonomic flexibility for the user. Such freedom and ergonomic flexibility is not found in traditional handheld devices having a thumbwheel. An escape switch 5010 also is mounted on the first portion 5006 of the PCB 5002, and is acuatable by a button 5012 (FIG. 9) in a known manner. A connector 5014 is mounted on the second portion 5008 of the thumbwheel PCB 5002 to connect the second portion 5008 directly with the main PCB 5004 in an orientation parallel to the main PCB 5004. The first portion 5006 of the thumbwheel PCB 5002 then supports the thumbwheel 4002 in the inclined orientation described above.

Having described in detail the preferred embodiments of the present invention, including the preferred methods of operation, it is to be understood that the preferred embodiments are presented only by way of example and are not meant to limit the scope of the present invention that is defined by the following claims.

The invention claimed is:

1. A method of inputting an E-mail address into a communication device, the E-mail address having three text fields, the method comprising the steps of:
    (A) inputting a first set of text characters associated with a first text field of a field designed to hold an E-mail address in an electronic message;
    (B) the device detecting when an entry is being made in the field designed to hold the E-mail address;
    (C) inputting a first delimiter and substituting the at-sign symbol (@) for the first delimiter;
    (D) appending the at-sign symbol (@)to the first text field of the field designed to hold the E-mail address;
    (E) inputting a second set of text characters associated with a second text field of the field designed to hold the E-mail address;
    (F) inputting a second delimiter and substituting a period symbol (.) for the second delimiter;
    (G) appending the period symbol (.) to the second text field of the field designed to hold the E-mail address; and
    (H) inputting a third set of text characters associated with a third text field of the field designed to hold the E-mail address.

2. The method of claim 1, wherein the first delimiter is a blank space delimiter input by selecting a space bar associated with the communication device.

3. The method of claim 1, wherein the first and second delimiters are blank space delimiters input by selecting a space bar associated with the communication device.

4. A method of changing the character display associated with a first set of characters on a mobile device having a display, a keyboard, and a memory, the method comprising the steps of:
    (A) storing a second set of characters in the memory of the mobile device, wherein the memory associates the second set of characters with the first set of characters;
    (B) inputting the first set of characters into a field designed to hold an E-mail address in an electronic message using the keyboard, and displaying the first set of characters;
    (C) the device detecting when an entry is being made in the field designed to hold the E-mail address;
    (D) scanning the memory and determining that the first set of characters is associated with the second set of characters; and
    (E) replacing the first set of characters on the display with the second set of characters.

5. A method of automatic character substitution in a mobile communications device, comprising the steps of:
    entering a first portion of text in a field designed to hold an E-mail address in an electronic message; entering a first delimiter trigger in the field designed to hold the E-mail address;
    detecting when an entry is being made in the field designed to hold the E-mail address;
    automatically substituting a first text delimiter for the first delimiter trigger; and
    entering a second portion of text in the field designed to hold the E-mail address that is automatically separated from the first portion of text by the first text delimiter.

6. The method of claim 5, wherein the first portion of text is an electronic mail username and the second portion of text is an electronic mail secondary domain name.

7. The method of claim 5, comprising the additional steps of:
    entering a second delimiter trigger in a field designed to hold an E-mail address in an electronic message;
    detecting when an entry is being made in the field designed to hold the E-mail address;
    automatically substituting a second electronic mail delimiter for the second delimiter trigger; and
    entering a third portion of text in the field designed to hold the E-mail address that is automatically separated from the second portion of text by the second delimiter trigger.

8. The method of claim 5, wherein the first text delimiter is an at-sign (@) character.

9. The method of claim 7, wherein the second text delimiter is a period (.) character.

10. The method of claim 5, wherein the first delimiter trigger is a blank space.

11. The method of claim 7, wherein the second delimiter trigger is a blank space.

12. The method of claim 7, wherein the first portion of text is an electronic mail username, the second portion of text is an electronic mail secondary domain name, and the third portion of text is a top-level electronic mail domain name.

13. A mobile communication device with intelligent character substitution, comprising:
 a processor;
 a display coupled to the processor;
 a user interface coupled to the processor;
 an electronic mail application program executed by the processor that processes electronic mail messages input to the mobile communication device with the user interface and displays the electronic mail messages on the display, wherein the electronic mail messages include an address field; and
 an intelligent character substitution software module executed by the processor that detects a delimiter trigger in the address field of an electronic mail message and automatically substitutes an electronic mail delimiter for the delimiter trigger.

14. The mobile communication device of claim 13, wherein the delimiter trigger is a blank space.

15. The mobile communication device of claim 13, wherein the electronic mail delimiter is an at-sign (@) character.

16. The mobile communication device of claim 13, wherein the electronic mail delimiter is a period (.) character.

17. The mobile communication device of claim 13, wherein the user interface includes a keyboard.

18. The mobile communication device of claim 13, wherein the user interface includes a thumbwheel.

19. The mobile communication device of claim 13, further comprising:
 a transceiver circuit coupled to the processor that sends and receives electronic mail messages over a wireless network.

20. A method of automatic character substitution in a mobile communication device, comprising the steps of:
 providing an e-mail field configured for holding an e-mail address;
 defining a trigger character;
 defining a substitute character;
 detecting when an entry is being made in the field designed to hold the E-mail address;
 detecting the trigger character in text entered into the field configured for holding the e-mail address; and automatically substituting the substitute character for the trigger character.

21. The method of claim 20, wherein the triggering character is a letter character and the substitute character is a number character.

22. The method of claim 20, wherein the triggering character is a blank space and the substitute character is an at-sign (@) character.

23. The method of claim 20, wherein the triggering character is a blank space and the substitute character is a period (.) character.

24. The method of claim 20, further comprising the steps of:
 defining a set of trigger characters;
 defining a set of substitute characters;
 detecting when an entry is being made in a field designed to hold an E-mail address;
 detecting one trigger character from the set of trigger characters in text entered into the field designed to hold the e-mail address; and
 automatically substituting one substitute character from the set of substitute characters for the one trigger character.

* * * * *